(12) United States Patent
Itoh (10) Patent No.: US 7,061,685 B2
(45) Date of Patent: Jun. 13, 2006

(54) ZOOM LENS SYSTEM

(75) Inventor: Yoshinori Itoh, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 58 days.

(21) Appl. No.: 10/968,963

(22) Filed: Oct. 21, 2004

(65) Prior Publication Data

US 2005/0141101 A1    Jun. 30, 2005

(30) Foreign Application Priority Data

Oct. 31, 2003    (JP)    ............... 2003-372404

(51) Int. Cl.
   *G02B 15/14*    (2006.01)
(52) U.S. Cl. ............... 359/682; 359/680; 359/681
(58) Field of Classification Search ............... 359/680, 359/681, 682
   See application file for complete search history.

(56) References Cited

U.S. PATENT DOCUMENTS

| | | | |
|---|---|---|---|
| 4,733,952 A | 3/1988 | Fujioka | 359/681 |
| 5,434,710 A | 7/1995 | Zozawa | 359/689 |
| 6,008,953 A | 12/1999 | Itoh | 359/692 |
| 6,081,389 A | 6/2000 | Takayama et al. | 359/680 |
| 6,172,818 B1 | 1/2001 | Sakamoto | 359/689 |
| 6,243,213 B1 | 6/2001 | Mori | 359/681 |
| 6,327,099 B1 | 12/2001 | Itoh | 359/686 |
| 6,836,375 B1 | 12/2004 | Ito | 359/682 |

FOREIGN PATENT DOCUMENTS

| | | |
|---|---|---|
| JP | 7-52256 B2 | 6/1995 |
| JP | 10-213745 | 8/1998 |
| JP | 11-052237 | 2/1999 |
| JP | 2000-009999 | 1/2000 |
| JP | 2000-137164 | 5/2000 |
| JP | 2000-147381 | 5/2000 |
| JP | 2001-100098 | 4/2001 |

*Primary Examiner*—David N. Spector
(74) *Attorney, Agent, or Firm*—Fitzpatrick, Cella, Harper & Scinto (57) ABSTRACT

Provided is a zoom lens system suitably used for, for example, an image taking optical system of a camera including a solid-state image pickup element. The zoom lens system includes a first lens unit having negative optical power, a second lens unit having positive optical power, and a third lens unit having positive optical power. During zooming, an interval between the first lens unit and the second lens unit and an interval between the second lens unit and the third lens unit are changed. The first lens unit consists of a first lens element having negative optical power and a second lens element having positive optical power. The first lens element has an aspherical surface. The first lens element is made of a material having a high refractive index.

13 Claims, 9 Drawing Sheets

ZOOM LENS SYSTEM

BACKGROUND OF THE INVENTION

1. Field of the Invention

The present invention relates to a zoom lens system, and more particularly a zoom lens system suitably used for an image pickup apparatus such as a video camera or a digital still camera.

2. Related Background Art

In recent years, with improvement in a function of an image pickup apparatus using a solid-state image pickup element, such as a video camera or a digital still camera, a compact zoom lens system having a high resolution has been desired as an image taking optical system used for the image pickup apparatus.

In general, as a compact zoom lens used for the image pickup apparatus using a solid-state image pickup element such as a CCD sensor of a video camera, a digital still camera, or the like, there has been known a zoom lens which includes a first lens unit with negative refractive power, a second lens unit with positive refractive power, and a third lens unit with positive refractive power which are disposed in order from an object side to an image side and in which an interval between the second lens unit and the third lens unit increases during zooming from a wide angle end to a telephoto end (for example, JP 07-052256 B (corresponding to U.S. Pat. No. 4,733,952)).

As another example, there has been known a zoom lens which includes a first lens unit with negative refractive power, a second lens unit with positive refractive power, and a third lens unit with positive refractive power which are disposed in order from an object side to an image side and in which an interval between the second lens unit and the third lens unit reduces during zooming from a wide angle end to a telephoto end (for example, U.S. Pat. No. 5,434,710).

As still another example, there has been known a zoom lens having three lens units including a first lens unit with negative refractive power, a second lens unit with positive refractive power, and a third lens unit with positive refractive power, which are disposed in order from an object side to an image side (for example, JP 10-213745 A and JP 2001-100098 A). The first lens unit includes three or more lenses and has at least one aspherical surface.

As yet still another example, there has been known a zoom lens which includes a first lens unit with negative refractive power, a second lens unit with positive refractive power, and a third lens unit with positive refractive power, which are disposed in order from an object side to an image side (for example, JP 11-052237 A (corresponding to U.S. Pat. No. 6,081,389) and JP 2000-009999 A (corresponding to U.S. Pat. No. 6,172,818)). The second lens unit is composed of a lens unit having positive refractive power and a lens unit having negative refractive power.

Besides the above examples, there has been known a zoom lens which includes a first lens unit with negative refractive power, a second lens unit with positive refractive power, and a third lens unit with positive refractive power, which are disposed in order from the object side to the image side (for example, JP 2000-137164 A and JP 2000-147381 A (corresponding to U.S. Pat. No. 6,243,213)). Focusing is performed using the second lens unit.

In recent years, with reduction in size of the image pickup apparatus and increase in the number of pixels of the image pickup element, a zoom lens which has a high optical performance and which is small in the entire lens system has been desired as a zoom lens used for a digital still camera, a video camera, and the like. In addition, it has been desired to record a high quality still image by the video camera. Therefore, a lens system which has a high optical performance but is small is required.

In general, with respect to a negative lead type zoom lens, in order to reduce the number of lenses in the entire lens system to simplify a lens structure and in order to obtain a preferable optical performance over the entire zoom range while attempting to widen a view angle, it is necessary to suitably set refractive power to each of the lens units, a lens structure of each of the lens units, a surface provided as an aspherical surface if the aspherical surface is used, and the like.

SUMMARY OF THE INVENTION

An object of the present invention is to provide a zoom lens system which obtains a desired zoom ratio and has a high optical performance capable of sufficiently coping with even such a case where a solid-state image pickup element having a large number of pixels is used, for example.

In order to achieve the above-mentioned object, an illustrative zoom lens system of the present invention includes a first lens unit having negative refractive power, a second lens unit having positive refractive power, and a third lens unit having positive refractive power, which are disposed in order from an object side to an image side. Intervals between the respective lens units changes during zooming. The first lens unit of the zoom lens system is composed of a first lens element having negative refractive power and a second lens element having positive refractive power. The first lens element has an aspherical surface. The following conditional expression is satisfied, $$1.83 < Ng1,$$

where Ng1 represents a refractive index of a material constituting the first lens element.

DESCRIPTION OF THE PREFERRED EMBODIMENTS

Hereinafter, a zoom lens system and an image pickup apparatus having the zoom lens system according to embodiments of the present invention will be described.

Figure 1A:
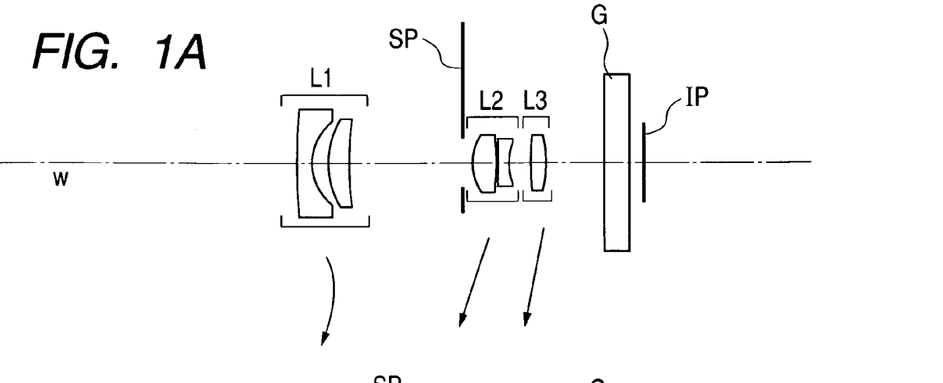
FIGS. 1A, 1B and 1C are sectional views showing a zoom lens according to Embodiment 1 of the present invention.
Figure 1B:
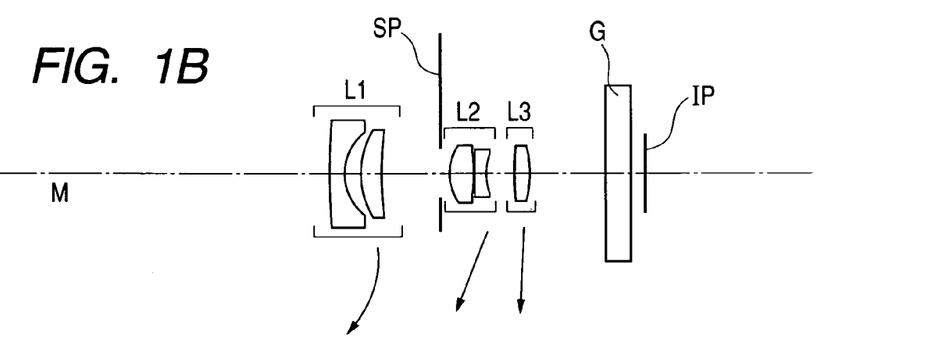
Figure 1C:
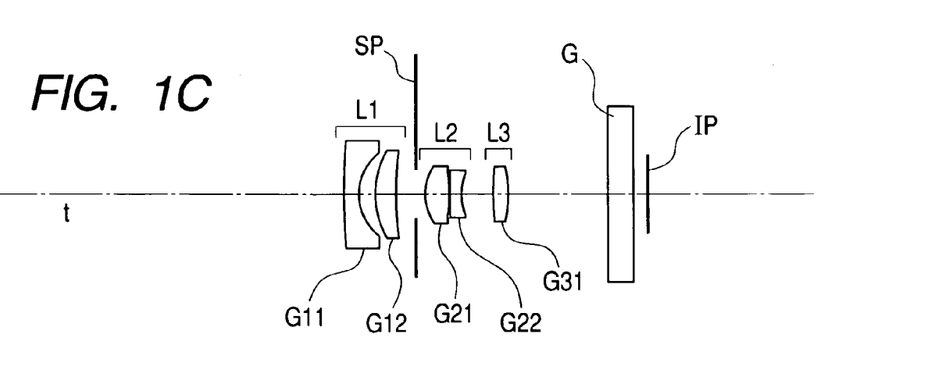
Figure 2A:
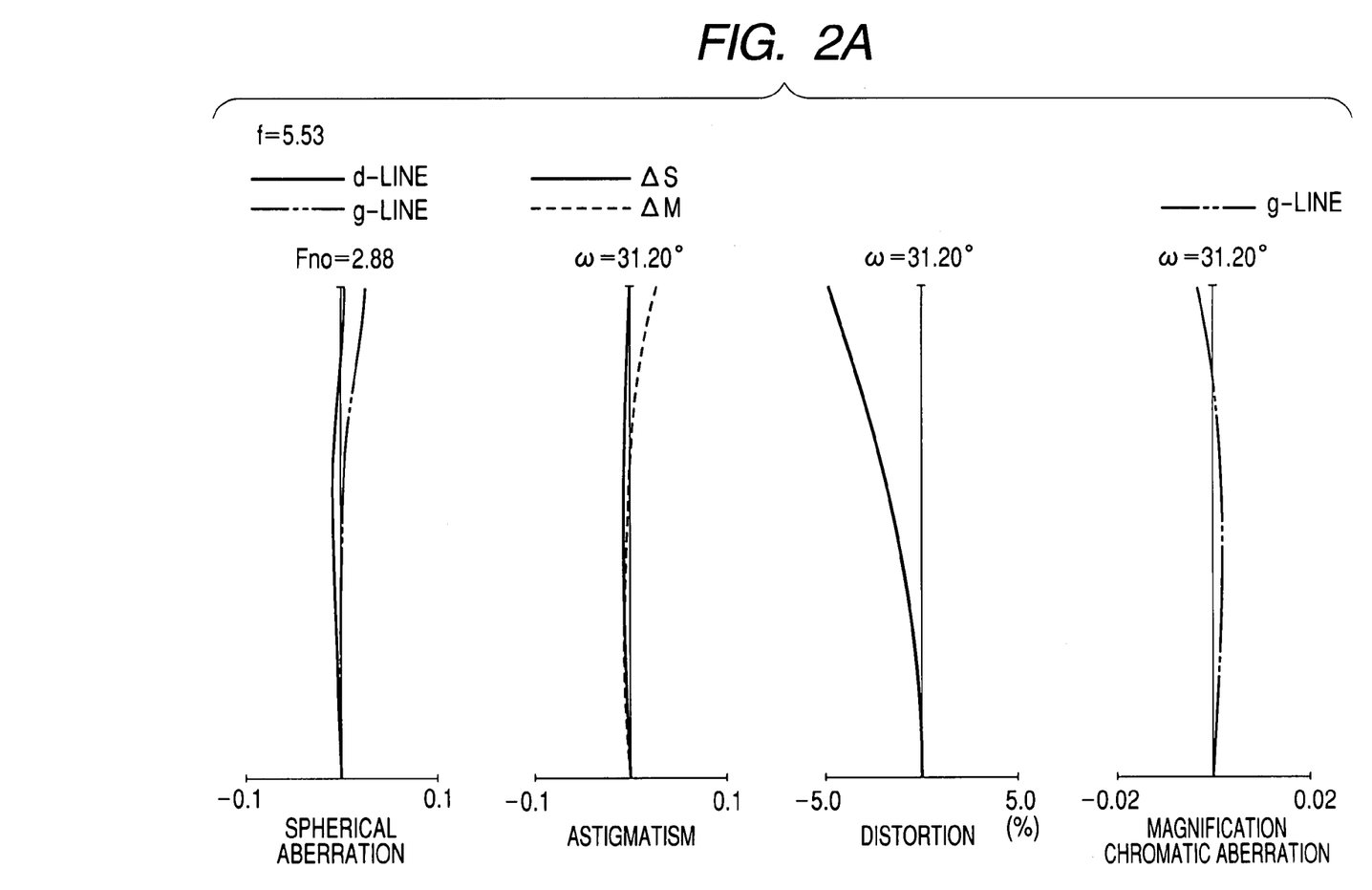
FIGS. 2A, 2B and 2C are aberration graphs of the zoom lens according to Embodiment 1 of the present invention.
Figure 2B:
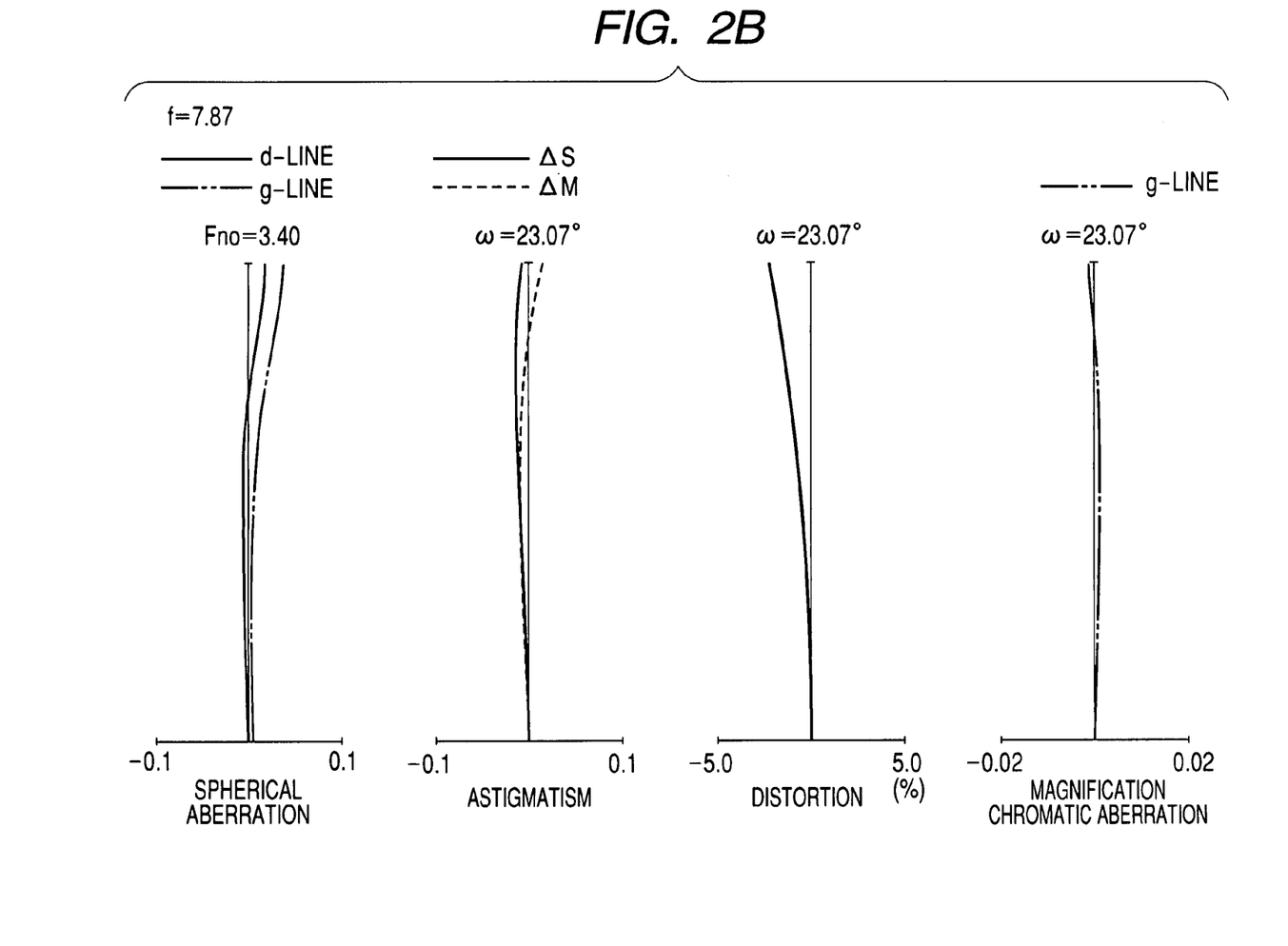
Figure 2C:
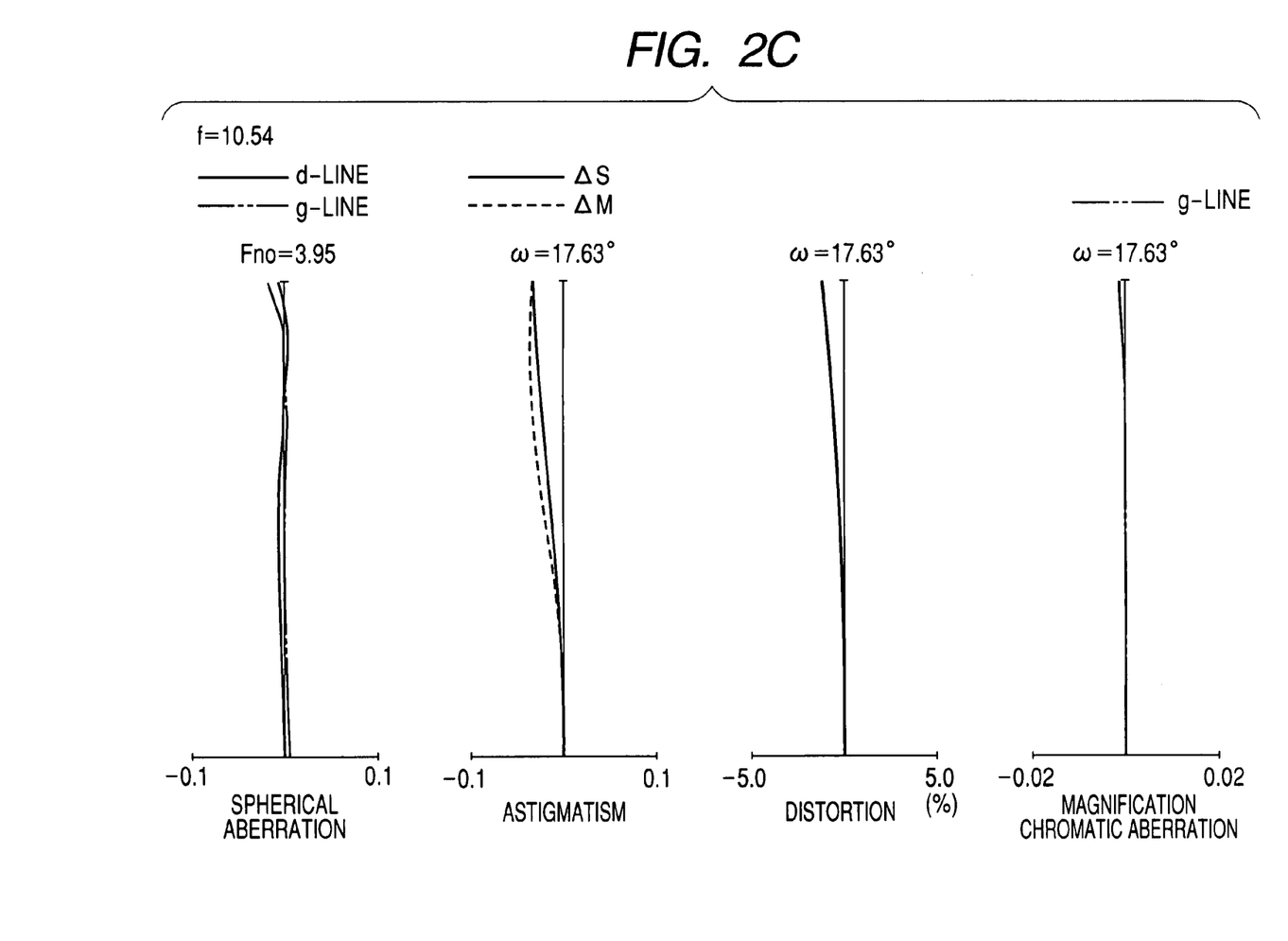

FIGS. 1A, 1B and 1C are sectional views showing a zoom lens according to Embodiment 1 of the present invention. FIG. 1A shows a state of the zoom lens at wide angle end. FIG. 1B shows a state of the zoom lens at an intermediate zoom position. FIG. 1C shows a state of the zoom lens at telephoto end. FIGS. 2A, 2B and 2C are aberration graphs of the zoom lens according to Embodiment 1. FIG. 2A shows a state of the zoom lens at the wide angle end. FIG. 2B shows a state of the zoom lens at the intermediate zoom position. FIG. 2C shows a state of the zoom lens at the telephoto end.

Figure 3A:
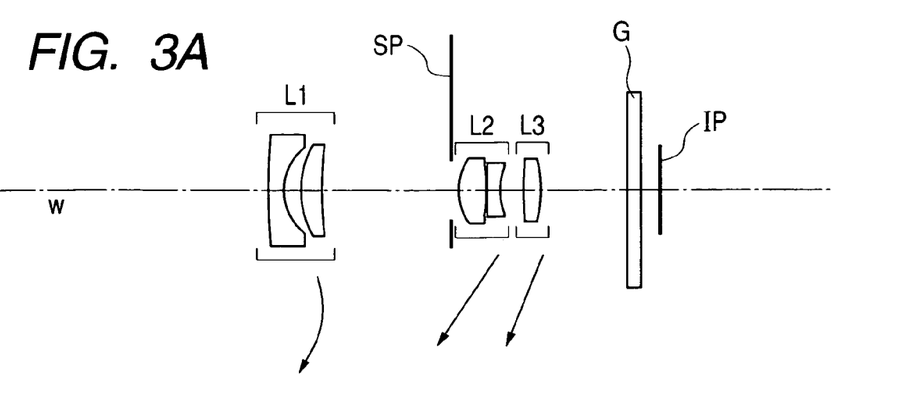
FIGS. 3A, 3B and 3C are sectional views showing a zoom lens according to Embodiment 2 of the present invention.
Figure 3B:
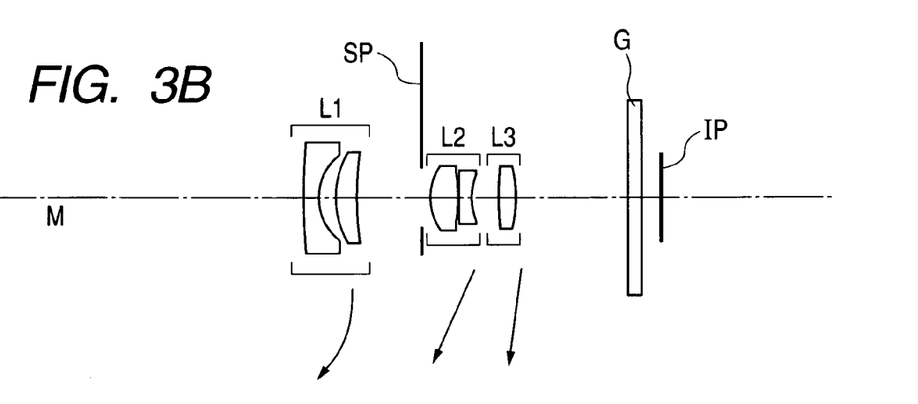
Figure 3C:
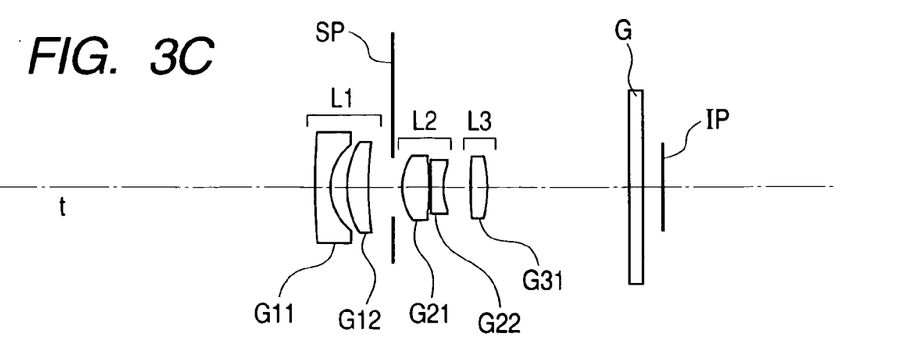
Figure 4A:
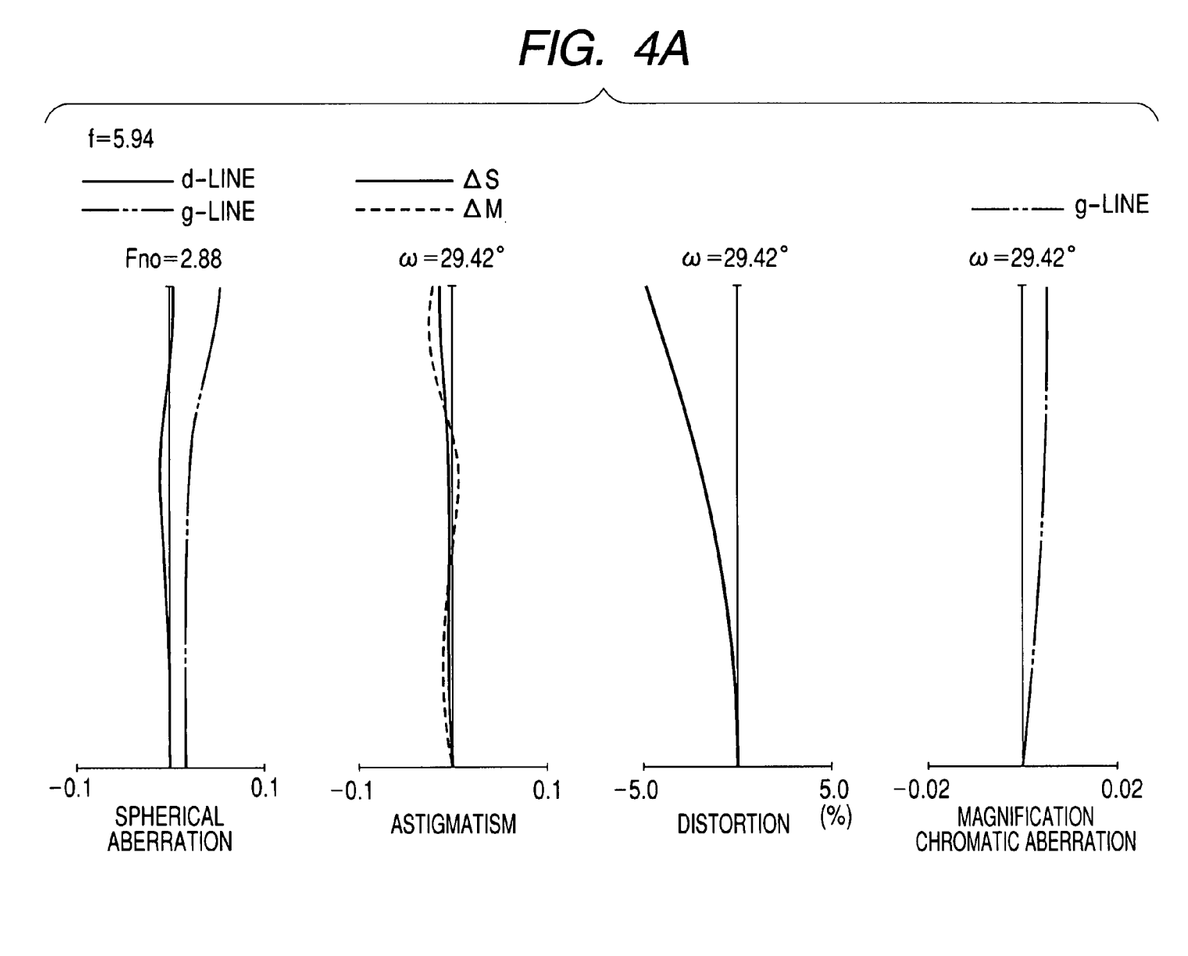
FIGS. 4A, 4B and 4C are aberration graphs of the zoom lens according to Embodiment 2 of the present invention.
Figure 4B:
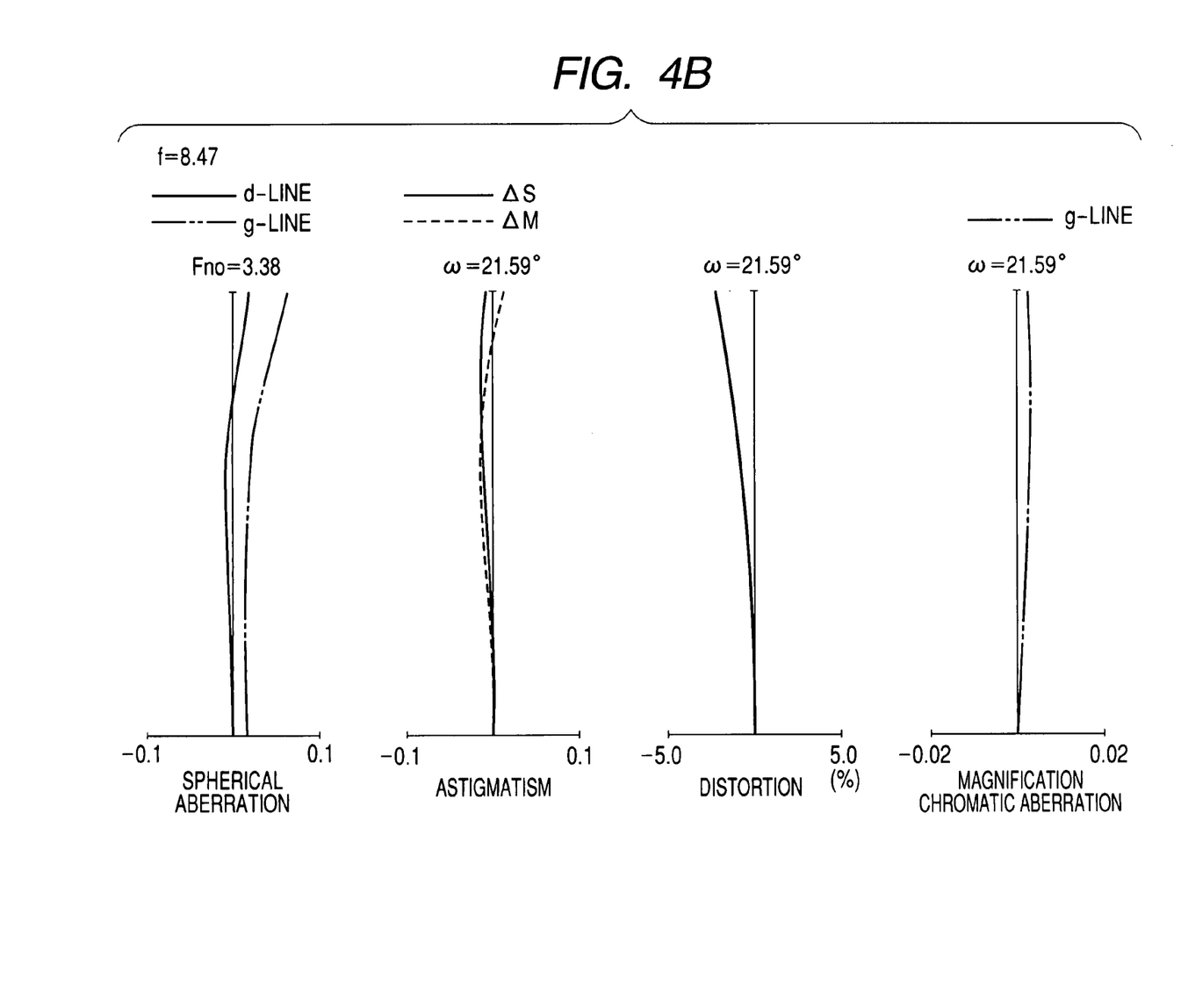
Figure 4C:
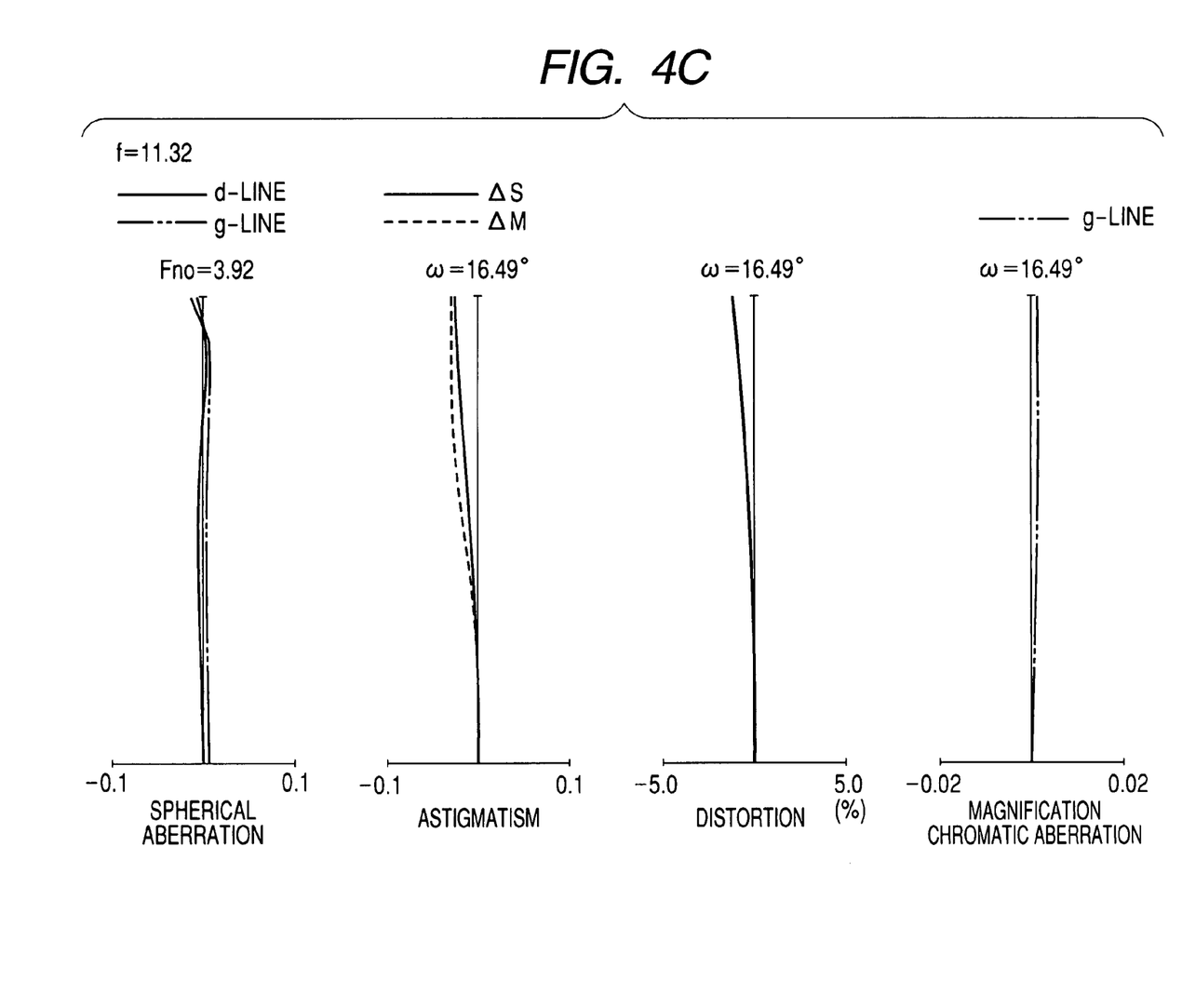

FIGS. 3A, 3B and 3C are sectional views showing a zoom lens according to Embodiment 2 of the present invention. FIG. 3A shows a state of the zoom lens at wide angle end. FIG. 3B shows a state of the zoom lens at an intermediate zoom position. FIG. 3C shows a state of the zoom lens at telephoto end. FIGS. 4A, 4B and 4C are aberration graphs of the zoom lens according to Embodiment 2. FIG. 4A shows a state of the zoom lens at the wide angle end. FIG. 4B shows a state of the zoom lens at the intermediate zoom position. FIG. 4C shows a state of the zoom lens at the telephoto end.

Figure 5:
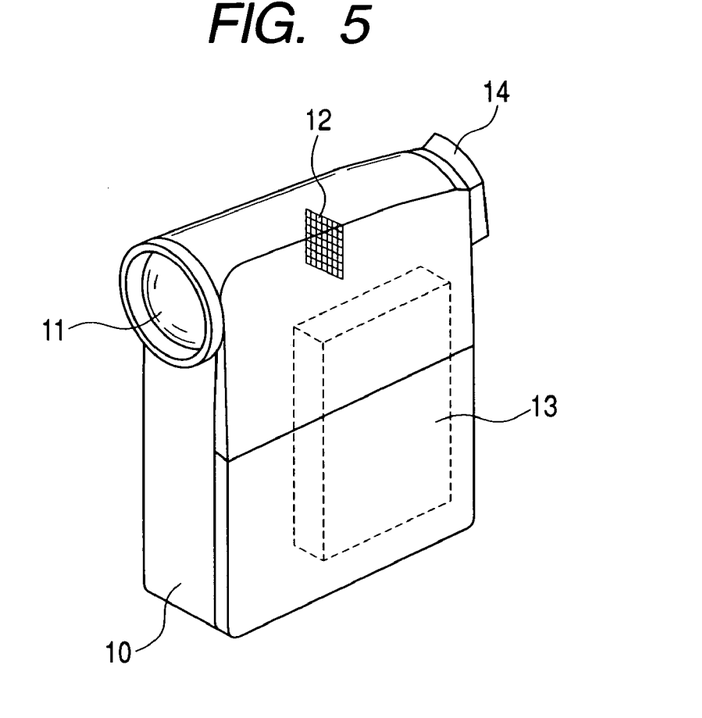
FIG. 5 is a main part schematic view showing a video camera.
Figure 6:
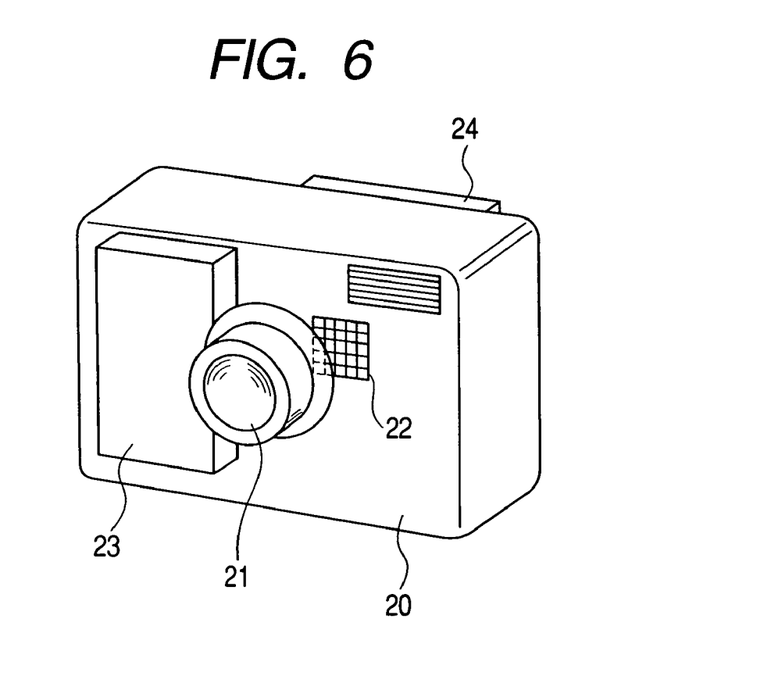
FIG. 6 is a main part schematic view showing a digital still camera.

FIG. 5 is a main part schematic view showing a video camera including the zoom lens system of the present invention. FIG. 6 is a main part schematic view showing a digital still camera including the zoom lens system of the present invention.

The zoom lens system according to each of the embodiments is an image taking lens system used for an image pickup apparatus. The left-hand side in the lens sectional views is subject side (front) and the right-hand side therein is image side (back). In the lens sectional views, L1 denotes a first lens unit having negative refractive power (optical power=the reciprocal of a focal length), L2 denotes a second lens unit having positive refractive power, and L3 denotes a third lens unit having positive refractive power. SP denotes an aperture stop, which is disposed on the object side of the second lens unit L2.

G denotes an optical block which is corresponding to an optical filter, a face plate, or the like in view of an optical design. IP denotes an image plane, on which a photosensitive surface is set, which corresponds to an image pickup surface of a solid-state image pickup element (photoelectric transducer) such as a CCD sensor or a CMOS sensor when a zoom lens is used for an image taking optical system in a video camera or a digital still camera, and to a film surface when the zoom lens is used for an image taking optical system in a silver halide film camera.

In the aberration graphs, "d" and "g" denote a d-line and a g-line, respectively. ΔM and ΔS denote a meridional image surface and a sagittal image surface, respectively. A magnification chromatic aberration is indicated by the g-line.

In the respective embodiments described below, zoom positions at the wide angle end and the telephoto end are a zoom position at a time when variable lens units (the second lens unit L2 and the third lens unit L3 in the respective embodiments) are located at either end in a movable range on an optical axis in view of a mechanism.

In each of the embodiments, during zooming from the wide angle end to the telephoto end, the first lens unit L1 moves toward the image side between the zoom position of the wide angle end and the intermediate zoom position. Then, the first lens unit L1 moves toward the object side between the intermediate zoom position and the zoom position of the telephoto end. That is, the first lens unit L1 partly draws a trajectory which is convex to the image side. At this time, the first lens unit L1 substantially reciprocates such that the entire lens length at the zoom position of the wide angle end becomes longer than the entire lens length at the zoom position of the telephoto end. The second lens unit L2 moves toward the object side and the third lens unit L3 moves toward the object side.

In each of the embodiments, the first lens units L1, the second lens unit L2, and the third lens unit L3 move such that an interval between the first lens unit L1 and the second lens unit L2 at the telephoto end becomes shorter than that at the wide angle end and an interval between the second lens unit L2 and the third lens unit L3 at the telephoto end becomes longer than that at the wide angle end.

The aperture stop SP is disposed between the second lens unit L2 and the third lens unit L3. During zooming, the aperture stop SP moves together with the second lens unit L2, thereby achieving simplification of the mechanical structure.

Focusing on from an object at infinity onto a near object is performed by moving the third lens unit L3 toward the object side.

The first lens unit L1 includes a first lens G11 having negative refractive power and a second lens G12 having positive refractive power, which are disposed in order from the object side to the image side. The first lens G11 is formed in a meniscus shape which is convex on the object side. The surface of the first lens G11 on the image side is an aspherical surface having a shape such that negative refractive power decreases from lens central portion to lens peripheral portion. An absolute value of the refractive power of the surface of the first lens G11 on the image side is larger than that on the object side. The second lens G12 is formed in a meniscus shape which is convex on the object side.

The second lens unit L2 includes a third lens G21 having positive refractive power and a fourth lens G22 having negative refractive power, which are disposed in order from the object side to the image side. The surface of the third lens G21 on the object side is an aspherical surface having a convex shape. An absolute value of refractive power of the surface of the third lens G21 on the object side is larger than that on the image side. The surface of the fourth lens G22 on the image side is an aspherical surface having a concave shape. An absolute value of refractive power of the surface of the fourth lens G22 on the image side is larger than that on the object side.

The third lens unit L3 includes a fifth lens G31 having positive refractive power in which each of both surfaces thereof is spherical.

A material having a high refractive index and high dispersibility is used for the second lens G12 having positive refractive power and the fourth lens G22 having negative refractive power. Therefore, each of the lens units corrects its on-axis chromatic aberration over the entire zoom range with high precision.

At least one of the following conditional expressions is satisfied, $$1.83 < Ng1 \tag{1}$$

$$0.2 < d23w/fw < 0.6 \tag{2}$$

$$0.2 < d23t/ft < 0.6 \tag{3}$$

$$-0.40 < Da/f1 < -0.35 \tag{4}$$

$$0.65 < R2/fw < 0.75 \tag{5}$$

$$-2.15 < f1/fw < -1.85 \tag{6}$$

$$15 < v21 - v22 \tag{7},$$

where Ng1 represents a refractive index of a material constituting the first lens G11, d23w and d23t represent intervals between the second lens unit L2 and the third lens unit L3 at the wide angle end and at the telephoto end when focusing on an object at infinity, respectively, fw and ft represent focal lengths of the entire system at the wide angle end and at the telephoto end, respectively, R2 represents a paraxial curvature radius of the surface of the first lens G11 on the image side, Da represents an interval between the first lens G11 and the second lens G12, f1 represents a focal length of the first lens unit L1, v21 and v22 represent Abbe numbers of material constituting the third lens G21 and the fourth lens G22, respectively.

Next, technical meanings of the above-mentioned conditional expressions will be described.

The conditional expression (1) relates to the refractive index of the material of the first lens G11 and is used to correct mainly a field curvature with high precision.

When the refractive index of the material of the first lens G11 becomes lower than a lower limit value of the conditional expression (1), it becomes difficult to correct a field curvature at the zoom position of the wide angle end because of a reduction in Petzval sum.

The conditional expressions (2) and (3) relate to interval between the second lens unit L2 and the third lens unit L3 at the wide angle end and at the telephoto end, respectively, and are mainly used to facilitate to downsize the entire zoom lens system.

When d23w exceeds an upper limit value of the conditional expression (2) and thus the interval d23w is too large, the second lens unit L2 is located at a distance from the aperture stop SP, so that an effective diameter resulting from an off-axis light beam increases. Therefore, the size of the second lens unit L2 increases, which is not preferable.

When d23w becomes smaller than a lower limit value of the conditional expression (2) and thus the interval d23w is too small, an exit pupil diameter becomes too short at the zoom position of the wide angle end. Therefore, the influence of shading increases, which is not preferable.

When d23t exceeds an upper limit value of the conditional expression (3) and thus the interval d23t is too large, the third lens unit L3 is located at a distance from the aperture stop SP at the telephoto end. Therefore, the effective diameter of the third lens unit L3 increases, which is not preferable.

When d23t becomes smaller than a lower limit value of the conditional expression (3) and thus the interval d23t is too small, the second lens unit L2 mechanically interferes with the third lens unit L3 at a near object during focusing by the third lens unit L3, which is not preferable.

When Da/f1 exceeds an upper limit value of the conditional expression (4), the first lens unit L1 becomes thicker, so that the diameter of the front lens thereof increases. Therefore, the size of the entire lens system increases, which is not preferable.

When Da/f1 becomes smaller than a lower limit value of the conditional expression (4) and thus the first lens unit L1 thins, a lens frame (lens holder) for holding the first lens G11 and second lens G12 to maintain a distance therebetween becomes thinner. Therefore, the strength of the lens frame becomes insufficient, which is not preferable.

When R2/fw exceeds an upper limit value of the conditional expression (5), the degree of difficulty in manufacturing the lens becomes higher, so that processing precision for obtaining a necessary performance cannot be ensured.

When R2/fw becomes smaller than a lower limit value of the conditional expression (5), the diameter of the front lens increases, which is not preferable.

The conditional expression (6) relates to the focal length of the first lens unit L1 and is used to correct mainly the field curvature with high precision. When f1/fw exceeds an upper limit value of the conditional expression (6), it becomes difficult to correct the field curvature over the entire zoom range with high precision.

When f1/fw becomes smaller than a lower limit value of the conditional expression (6), the entire lens length at the zoom position of the wide angle end becomes longer, which is not preferable.

When the conditional expression (7) is not satisfied, a variation in chromatic aberration, which is caused by zooming increases, which is not preferable.

It is more preferable to set a numeral range of each of the conditional expressions (1) to (7) as follows.

$$1.84 < Ng1 \tag{1a}$$

$$0.2 < d23w/fw < 0.4 \tag{2a}$$

$$0.2 < d23t/ft < 0.4 \tag{3a}$$

$$-0.395 < Da/f1 < -0.355 \tag{4a}$$

$$0.71 < R2/fw < 0.74 \tag{5a}$$

$$-2.05 < f1/fw < -1.91 \tag{6a}$$

$$20 < v < -v22 \tag{7a}$$

As described above, according to the respective embodiments, the lens structure of each of the lens units, a position of the aspherical surface, a manner of the movement of the respective lens units in zooming, and a focusing manner are optimized. Therefore, the number of lenses is reduced and the entire lens length is shortened. Despite such arrangement, it is possible to obtain a zoom lens system that has a zooming ratio of about 2, ensures brightness, provides a high optical performance, and obtains a zoom range of a wide angle. The zoom lens system is suitably used for a digital still camera, a video camera, and the like.

Hereinafter, Numerical Embodiments 1 and 2 respectively corresponding to Embodiments 1 and 2 of the present invention will be described. In each of Numerical Embodiments, "i" denotes the order of a surface from the object side, Ri denotes a curvature radius of each surface, Di denotes a thickness of a member or an interval between an i-th surface and an (i+1)-th surface, Ni denotes a refractive index based on a d-line, and vi denotes an Abbe number based on the d-line. The two surfaces nearest to the image side are the surfaces of the optical block G. With respect to an aspherical shape, assuming a displacement in an optical axis direction at a position at a height H from an optical axis is represented by X based on a surface vertex, X is expressed by the following expression, $$X = \frac{(1/R)H^2}{1 + \sqrt{1-(1+K)(H/R)^2}} + AH^2 + BH^4 + CH^6 + DH^8 + EH^{10},$$

where R represents a paraxial curvature radius, K represents a conic constant, and A, B, C, D, and E represent aspherical coefficients.

In addition, "e-x" indicates "$\times 10^{-X}$", denotes a focal length, Fno denotes an F number, and ω denotes a half view angle.

Table 1 shows a relationship between the respective conditional expressions described above and various aberrations in the numerical embodiments.

Numerical Embodiment 1
f = 5.53 to 10.54 Fno = 2.88 to 3.95 2ω = 62.4 to 35.3

| | | | |
|---|---|---|---|
| R 1 = 60.547 | D 1 = 1.20 | N 1 = 1.850000 | ν 1 = 40.1 |
| *R 2 = 4.069 | D 2 = 1.40 | | |
| R 3 = 7.188 | D 3 = 1.70 | N 2 = 1.805181 | ν 2 = 25.4 |
| R 4 = 28.487 | D 4 = Variable | | |
| R 5 = Stop | D 5 = 0.70 | | |
| *R 6 = 4.042 | D 6 = 2.00 | N 3 = 1.743300 | ν 3 = 49.3 |
| R 7 = −23.428 | D 7 = 0.20 | | |
| R 8 = 503.631 | D 8 = 0.90 | N 4 = 1.833100 | ν 4 = 23.9 |
| *R 9 = 4.511 | D 9 = Variable | | |
| R 10 = 24.555 | D 10 = 1.30 | N 5 = 1.516330 | ν 5 = 64.1 |
| R 11 = −11.385 | D 11 = Variable | | |
| R 12 = ∞ | D 12 = 2.10 | N 6 = 1.516330 | ν 6 = 64.1 |
| R 13 = ∞ | | | |

| | Focal length | | |
|---|---|---|---|
| Variable interval | 5.53 | 7.87 | 10.54 |
| D 4 | 9.83 | 4.97 | 1.84 |
| D 9 | 1.82 | 2.55 | 2.78 |
| D 11 | 4.84 | 6.36 | 8.38 |

Aspherical Coefficients

Surface 2: k=−2.76287e+00 A=0 B=3.89876e−03
C=−1.44321e−04 D=6.17083e−06 E=−1.36024e−07
Surface 6: k=−8.31903e−02 A=0 B=−2.55814e−04
C=−4.61725e−06 D=−4.27826e−06 E=−9.91627e−09
Surface 9: k=0.00000e+00 A=0 B=3.76126e−03
C=4.63225e−04 D=−1.60906e−05 E=4.86771e−06

Numerical Embodiment 2
f = 5.94 to 11.32 Fno = 2.88 to 3.92 2ω = 58.8 to 33.0

| | | | |
|---|---|---|---|
| R 1 = 92.887 | D 1 = 1.20 | N 1 = 1.850000 | ν 1 = 40.1 |
| *R 2 = 4.252 | D 2 = 1.40 | | |
| R 3 = 7.594 | D 3 = 1.50 | N 2 = 1.846660 | ν 2 = 23.9 |
| R 4 = 28.518 | D 4 = Variable | | |
| R 5 = Stop | D 5 = 0.70 | | |
| *R 6 = 4.460 | D 6 = 1.90 | N 3 = 1.772500 | ν 3 = 49.6 |
| R 7 = −34.134 | D 7 = 0.20 | | |
| R 8 = 62.804 | D 8 = 0.90 | N 4 = 1.833100 | ν 4 = 23.9 |
| *R 9 = 4.552 | D 9 = Variable | | |
| R 10 = 50.067 | D 10 = 1.30 | N 5 = 1.487490 | ν 5 = 70.2 |
| R 11 = −7.978 | D 11 = Variable | | |
| R 12 = ∞ | D 12 = 1.00 | N 6 = 1.516330 | ν 6 = 64.1 |
| R 13 = ∞ | | | |

| | Focal length | | |
|---|---|---|---|
| Variable interval | 5.94 | 8.47 | 11.32 |
| D 4 | 10.00 | 4.95 | 1.83 |
| D 9 | 1.88 | 2.36 | 2.44 |
| D 11 | 6.50 | 8.41 | 10.71 |

Aspherical Coefficients

Surface 2: k=−2.45120e+00 A=0 B=2.86883e−03
C=−7.56312e−05 D=2.21524e−06 E=−2.94019e−08
Surface 6: k=1.05429e−01 A=0 B=−5.83774e−04
C=−1.82882e−06 D=−7.07247e−06 E=2.19460e−07
Surface 9: k=0.00000e+00 A=0 B=2.36157e−03
C=3.05508e−04 D=−3.90876e−05 E=4.81403e−06

TABLE 1

| Numerical Embodiment | Conditional Expression | | | | | | |
|---|---|---|---|---|---|---|---|
| | 1 Ng1 | 2 d23w/fw | 3 d23t/ft | 4 Da/f1 | 5 R2/fw | 6 f1/fw | 7 ν21−ν22 |
| 1 | 1.85 | 0.33 | 0.26 | −0.38 | 0.735 | −2.04 | 25.4 |
| 2 | 1.85 | 0.32 | 0.22 | −0.36 | 0.72 | −1.92 | 25.7 |

Next, embodiment as a video camera and a digital still camera using the zoom lens system of the present invention as an image taking optical system will be described with reference to FIGS. 5 and 6.

In FIG. 5, reference numeral 10 denotes a video camera main body, reference numeral 11 denotes an image taking optical system composed of the zoom lens system of the present invention, reference numeral 12 denotes a solid-state image pickup element (photoelectric transducer) such as a CCD sensor or a CMOS sensor which receives a subject image through the image taking optical system 11, reference numeral 13 denotes a memory which stores information corresponding to the subject image which is photoelectrically converted by the image pickup element 12, and reference numeral 14 denotes a finder used for observing the subject image displayed on a display element (not shown) which is composed of a liquid crystal panel or the like and displays the subject image formed on the solid-state image pickup element 12.

In FIG. 6, reference numeral 20 denotes a camera main body, reference numeral 21 denotes an image taking optical system composed of the zoom lens system of the present invention, reference numeral 22 denotes a solid-state image pickup element (photoelectric transducer) which incorporated in the camera main body 20 and receives a subject image formed by the image taking optical system 21 such as a CCD sensor or a CMOS sensor, reference numeral 23 denotes a memory which stores information corresponding to the subject image and is photoelectrically converted by the solid-state image pickup element 22, reference numeral 24 denotes a finder composed of a liquid crystal display panel or the like and used for observing the subject image formed on the solid-state image pickup element 22.

As described above, when the zoom lens system of the present invention is applied to an image pickup apparatus such as the video camera and the digital still camera, a small size image pickup device having a high optical performance can be realized.

This application claims priority from Japanese Patent Application No. 2003-372404 filed on Oct. 31, 2003, which is hereby incorporated by reference herein.

What is claimed is:

1. A zoom lens system, comprising, in order from object side to image side:
    a first lens unit having negative optical power, the first lens unit consisting of a first lens element having negative optical power and a second lens element having positive optical power;
    a second lens unit having positive optical power; and
    a third lens unit having positive optical power,
        wherein an interval between the first lens unit and the second lens unit and an interval between the second lens unit and the third lens unit are changed during zooming, wherein the first lens element has at least one aspherical surface, and wherein the following conditional expression is satisfied, $1.83 < Ng1$, where Ng1 represents a refractive index of a material constituting the first lens element.

2. A zoom lens system according to claim 1, wherein, in the first lens element, an absolute value of optical power of a surface on the image side thereof is larger than that on the object side thereof, and wherein the second lens element has a meniscus shape which is convex on the object side.

3. A zoom lens system according to claim 1, further comprising an aperture stop disposed between the first lens unit and the second lens unit.

4. A zoom lens system according to claim 1, wherein:

the second lens unit consists of a third lens element having positive optical power and a fourth lens element having negative optical power, which are disposed in order from object side to image side.

5. A zoom lens system according to claim 4, wherein:

the following conditional expression is satisfied, $15 < \nu 21 - \nu 22$, where $\nu 21$ represents an Abbe number of a material constituting the third lens element and $\nu 22$ represents an Abbe number of a material constituting the fourth lens element.

6. A zoom lens system according to claim 1, wherein:

the following conditional expressions are satisfied, $0.2 < d23w/fw < 0.6$, $0.2 < d23t/ft < 0.6$, where d23w represents an interval between the second lens unit and the third lens unit at wide angle end, d23t represents an interval between the second lens unit and the third lens unit at telephoto end, fw represents a focal length of the zoom lens system at wide angle end, and ft represents a focal length of the zoom lens system at telephoto end.

7. A zoom lens system according to claim 1, wherein:

the third lens unit consists of a fifth lens element having positive optical power in which each of both surfaces thereof is spherical.

8. A zoom lens system according to claim 1, wherein:

the third lens unit moves during focusing.

9. A zoom lens system according to claim 1, wherein:

the following conditional expression is satisfied, $-0.40 < Da/f1 < -0.35$, where Da represents an interval between the first lens element and the second lens element and f1 represents a focal length of the first lens unit.

10. A zoom lens system according to claim 1, wherein:

the following conditional expression is satisfied, $0.65 < R2/fw < 0.75$, where R2 represents a paraxial curvature radius of a surface of the first lens element on the image side and fw represents a focal length of the zoom lens system at wide angle end.

11. A zoom lens system according to claim 1, wherein:

the following conditional expression is satisfied, $-2.15 < f1/fw < -1.85$, where f1 represents a focal length of the first lens unit and fw represents a focal length of the zoom lens system at wide angle end.

12. A zoom lens system according to claim 1, wherein the zoom lens system forms an image on a photoelectric transducer.

13. An image pickup apparatus, comprising:

a zoom lens system according to claim 1; and a photoelectric transducer for receiving an image formed by the zoom lens system.

* * * * *

UNITED STATES PATENT AND TRADEMARK OFFICE
CERTIFICATE OF CORRECTION

PATENT NO. : 7,061,685 B2
APPLICATION NO. : 10/968963
DATED : June 13, 2006
INVENTOR(S) : Yoshinori Itoh It is certified that error appears in the above-identified patent and that said Letters Patent is hereby corrected as shown below:

COLUMN 3
Line 66, "units" should read --unit--.

COLUMN 6
Line 25, "$20<v<-v22$" should read --$20<v21-v22$--.
Line 61, "denotes" should read -- f denotes--.

COLUMN 8
Line 35, "which" should read --which is--.
Line 42, "and a finder" should read --a finder--.

Signed and Sealed this

Thirteenth Day of March, 2007

JON W. DUDAS
*Director of the United States Patent and Trademark Office*